(12) United States Patent
Artusi et al.

(10) Patent No.: US 10,901,235 B2
(45) Date of Patent: Jan. 26, 2021

(54) FRAME FOR SPECTACLES

(71) Applicant: Safilo Società Azionaria Fabbrica Italiana Lavorazione Occhiali S.P.A., Padua (IT)

(72) Inventors: Ampelio Artusi, Padua (IT); Marco Queboli, Padua (IT)

(73) Assignee: SAFILO SOCIETA AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 93 days.

(21) Appl. No.: 16/078,444

(22) PCT Filed: Feb. 8, 2017

(86) PCT No.: PCT/EP2017/052704
§ 371 (c)(1),
(2) Date: Aug. 21, 2018

(87) PCT Pub. No.: WO2017/144272
PCT Pub. Date: Aug. 31, 2017

(65) Prior Publication Data
US 2019/0094569 A1    Mar. 28, 2019

(30) Foreign Application Priority Data

Feb. 22, 2016   (IT) .......................... 102016000018058

(51) Int. Cl.
*G02C 5/22*    (2006.01)
(52) U.S. Cl.
CPC ......... *G02C 5/2209* (2013.01); *G02C 5/2254* (2013.01); *G02C 2200/12* (2013.01); *G02C 2200/22* (2013.01)

(58) Field of Classification Search
CPC ...... G02C 5/22; G02C 5/2209; G02C 5/2218; G02C 5/2227; G02C 5/2236; G02C 5/2245; G02C 5/2254
(Continued)

(56) References Cited

U.S. PATENT DOCUMENTS 3,145,254 A * 8/1964 McCulloch .......... G02C 5/2209
                                                              351/153
3,923,384 A * 12/1975 Leblanc ............... G02C 5/2254
                                                              351/113

(Continued)

FOREIGN PATENT DOCUMENTS

EP    2485080 A1    8/2012
EP    2846181 A1    3/2015
(Continued)

*Primary Examiner* — Nicholas R. Pasko
(74) *Attorney, Agent, or Firm* — Volpe Koenig

(57) ABSTRACT

A frame for spectacles includes a frontal framework with lateral lugs for articulation of arms and means of articulation between each lug and the corresponding arm. The articulation means include a flexible member, structurally independent of the lug and the arm, the flexible member being held on the arm and coupled rotatably, the end of each arm, facing the corresponding lug, shaped in such a manner that the arm, in its movement about the hinge pin, is flexibly constrained towards preselected angular positions relative to the frontal framework. The frame also includes a respective distance element interposed between each arm and the corresponding flexible member, and said distance element is mounted on the arm in an adjustable manner in order to impose, at the level of said distance member, a preselected distance between the arm and the flexible member, and to regulate a flexible pre-load exerted on the flexible member.

9 Claims, 6 Drawing Sheets

(58) Field of Classification Search
USPC .................................................. 351/121, 153
See application file for complete search history.

(56) References Cited

U.S. PATENT DOCUMENTS

| | | | | |
|---|---|---|---|---|
| 4,618,226 | A * | 10/1986 | Sartor .................. | G02C 5/2254 351/113 |
| 5,818,567 | A * | 10/1998 | Sakai ................... | G02C 5/2254 351/113 |
| 5,959,715 | A * | 9/1999 | Jaffelin ................. | G02C 5/008 16/228 |
| 6,336,250 | B1 * | 1/2002 | Takeda .................... | G02C 5/10 16/228 |
| 6,585,372 | B1 * | 7/2003 | Nagayoshi ............. | G02C 5/008 16/228 |
| 8,533,913 | B2 | 9/2013 | Buchegger et al. | |
| 8,827,444 | B1 * | 9/2014 | Koo ..................... | G02C 5/2254 351/121 |
| 2004/0223115 | A1 * | 11/2004 | Zancolo ............... | G02C 5/2254 351/153 |
| 2007/0121061 | A1 * | 5/2007 | Kim ........................ | G02C 5/10 351/153 |
| 2013/0044288 | A1 * | 2/2013 | Cheng .................. | G02C 5/2209 351/121 |
| 2013/0239366 | A1 * | 9/2013 | Kim ..................... | G02C 5/2254 16/228 |
| 2015/0009471 | A1 * | 1/2015 | Kacavenda .......... | G02C 5/2209 351/153 |

FOREIGN PATENT DOCUMENTS

| | | | | |
|---|---|---|---|---|
| FR | 2703477 | A1 * | 10/1994 | .......... G02C 5/2254 |
| FR | 2815728 | A1 | 4/2002 | |
| WO | 2015071067 | A1 | 5/2015 | |
| WO | 2015185831 | A1 | 12/2015 | |

* cited by examiner

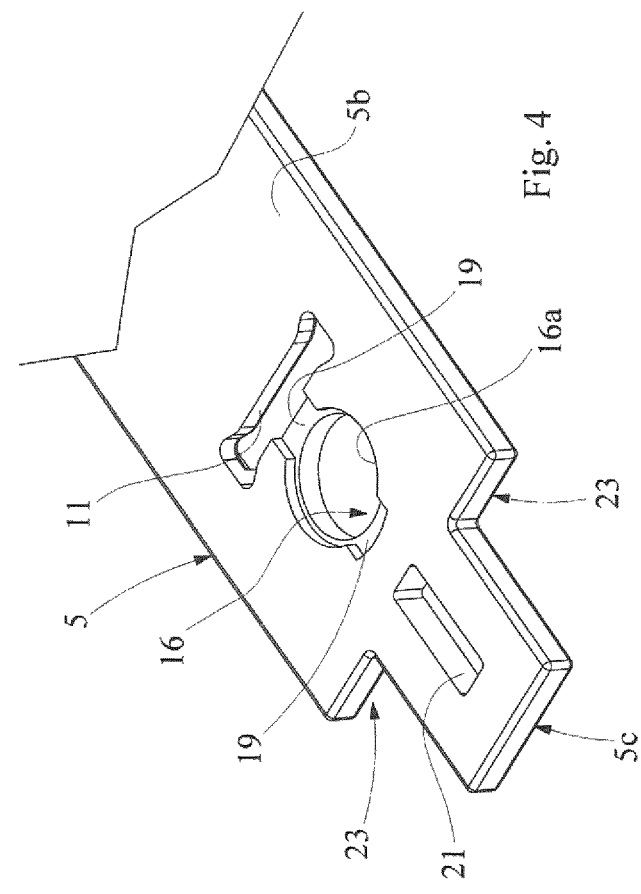
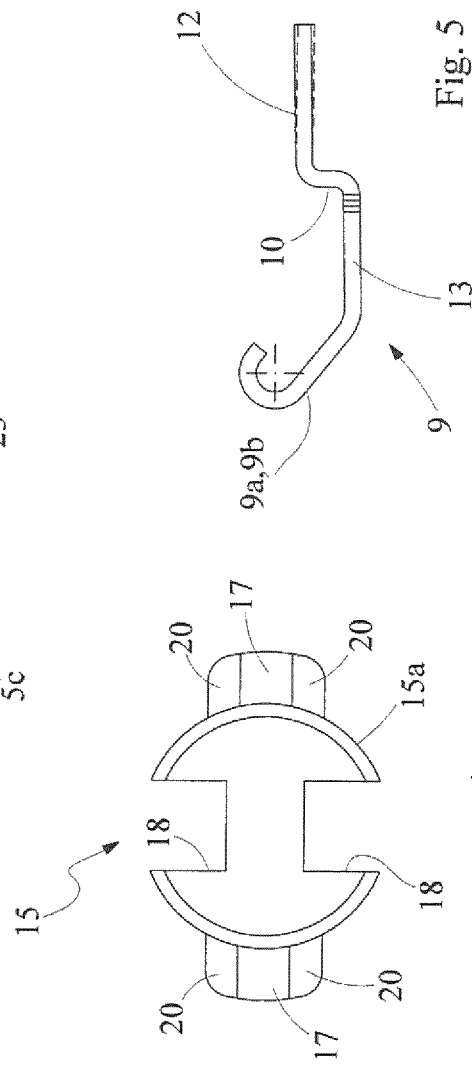
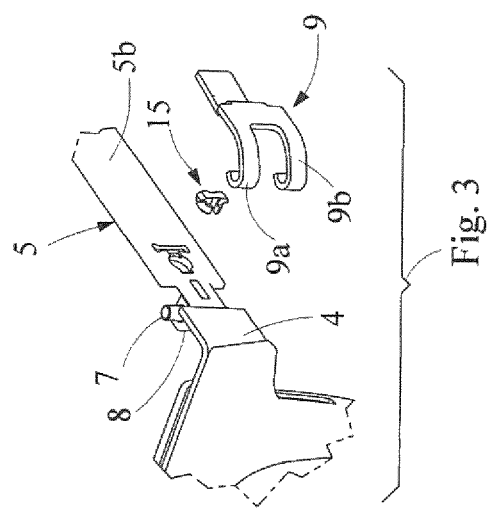
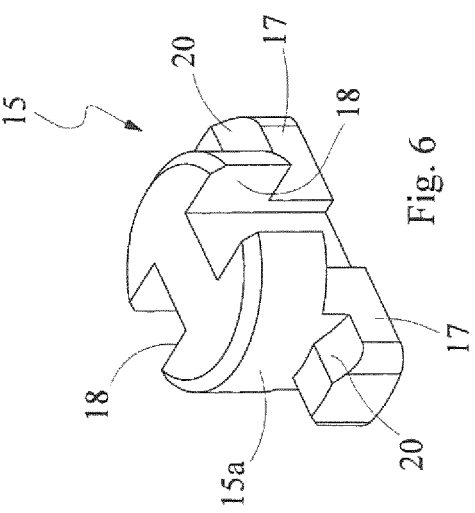

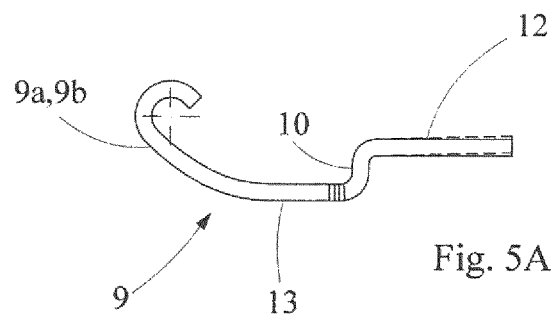
Fig. 5A
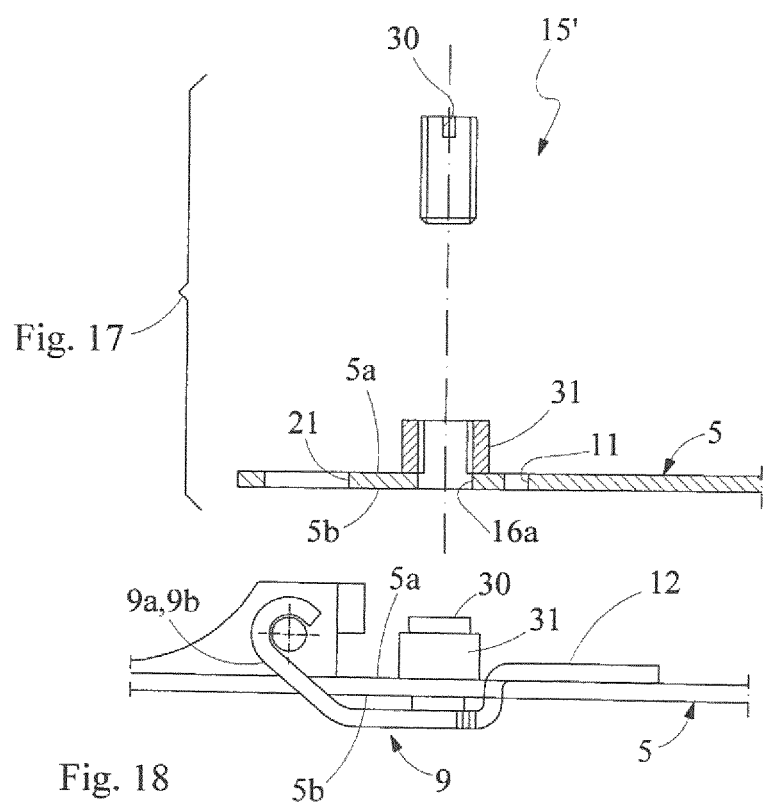
Fig. 17
Fig. 18

US 10,901,235 B2

FRAME FOR SPECTACLES

TECHNICAL FIELD

The present invention relates to a frame for spectacles having the characteristics set out in the preamble of main claim 1.

TECHNOLOGICAL BACKGROUND

In the specific technical field, spectacle frames are well known in which the articulated connection of the arms to the frontal framework is achieved by means of hinge devices having respective pins and eyelets coupled together rotatably, the hinge elements of said devices being suitably attached to the arm and the lug of the frame.

This type of solution, in its various versions made available by the prior art, traditionally involves certain limits, such as the possible undesired loosening of the hinge screw or pin, the need to produce a plurality of components required for the hinged articulation, the bulkiness dictated by the necessary components, and the weight of the hinge device, which is ill-suited for use in lightweight frames.

Solutions are also known for the articulated connection of the arm to the frontal lug of the frame that do not provide for any traditional hinge structure of the above-mentioned type. For example, known systems provide for the arm-end facing the frontal lug to be divided into several separate parts over a sufficient length to provide said parts with a reciprocal flexible behaviour. The curved end of one or more of said parts, together with the other parts, hold the arm in an articulated manner around a pin formation provided on the frame.

Such a solution, in addition to requiring special machining of the arm for the subdivision of the same into several parts, is necessarily linked to the flexibility characteristics of the material of said arm.

Solutions are also known in which a thin flexible plate is provided, attached to the arm and shaped in such a way as to engage rotatably, via a hinge coupling, with pin formations provided in the frontal lug of the frame.

In these solutions, the preselected flexible pre-load in the plate is induced at the same time as the assembly of the components of the hinge, and it is therefore necessary to deform the flexible plate, appropriately pushing against its elastic return, in order to complete the assembly phase. This operation is not particularly easy for the operator, who in some cases is obliged to use special assembly equipment.

DESCRIPTION OF THE INVENTION

The main aim of the invention is to provide a frame for spectacles with means for the articulated connection of the arm to the front of the frame, structurally and functionally designed to overcome the limitations outlined with reference to the known solutions, particularly in relation to the articulation means of the arms, a simplified structure, easily assembled on to the frame, of particular lightness and limited bulk, so as to be capable of being applied even to especially thin and light frames.

Another aim of the invention is to render the flexibility characteristics of the articulation system of the arm independent from the material from which said arm is made.

The above aims, as well as others which will become apparent hereinafter, are achieved by a frame for spectacles produced in accordance with the appended claims.

BRIEF DESCRIPTION OF THE DRAWINGS

Further characteristics and advantages of the invention will become clearer from the following detailed description of a preferred embodiment, given by way of non-limitative example, with reference to the accompanying drawings in which:

FIG. 3 is a partially cross-sectional exploded perspective view, on an enlarged scale, of a detail of the frame of the preceding figures, FIG. 4 is a partially cross-sectional perspective view, on an enlarged scale, of a detail of FIG. 3, FIG. 5 is a plan view, on an enlarged scale, of a further detail of FIG. 3, FIG. 5A is a view corresponding to that of FIG. 5, in a variant embodiment of the depicted detail, FIG. 6 is a perspective view, on an enlarged scale, of a further detail of FIG. 3, FIG. 7 is a front elevation view of the detail of FIG. 6, FIG. 17 is a side elevation view, in partial longitudinal cross-section and with separated parts, of a detail of the invention shown in FIG. 3, FIG. 18 is a side elevation view, in partial cross-section, of the detail of FIG. 17 shown in the assembled state on the frame.

PREFERRED EMBODIMENTS OF THE INVENTION

Figure 1:
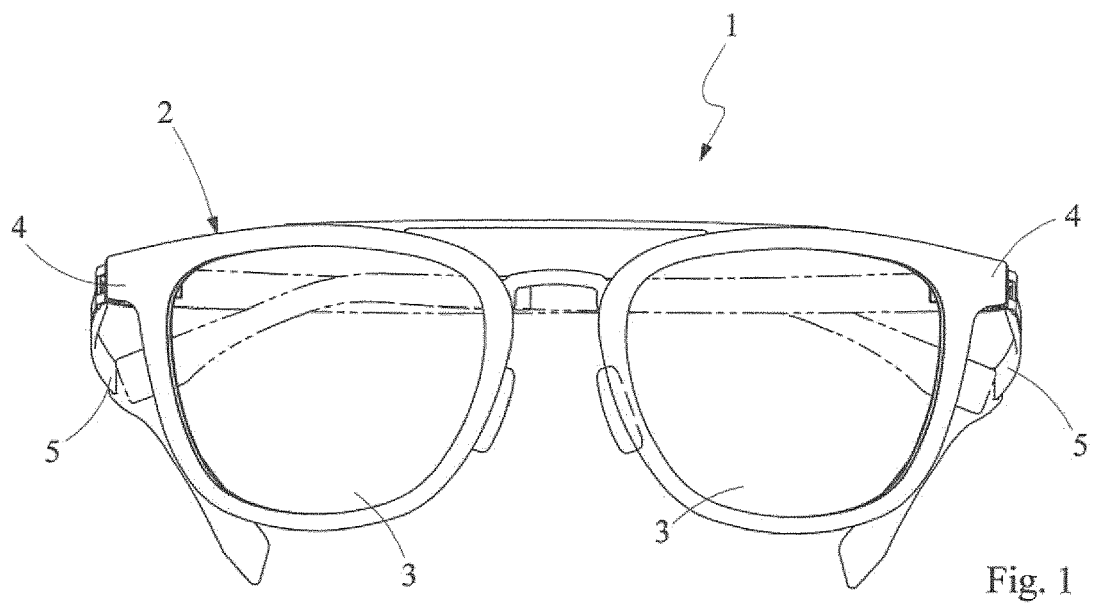
FIG. 1 is a front elevation view of a frame for spectacles produced in accordance with the present invention.
Figure 2:
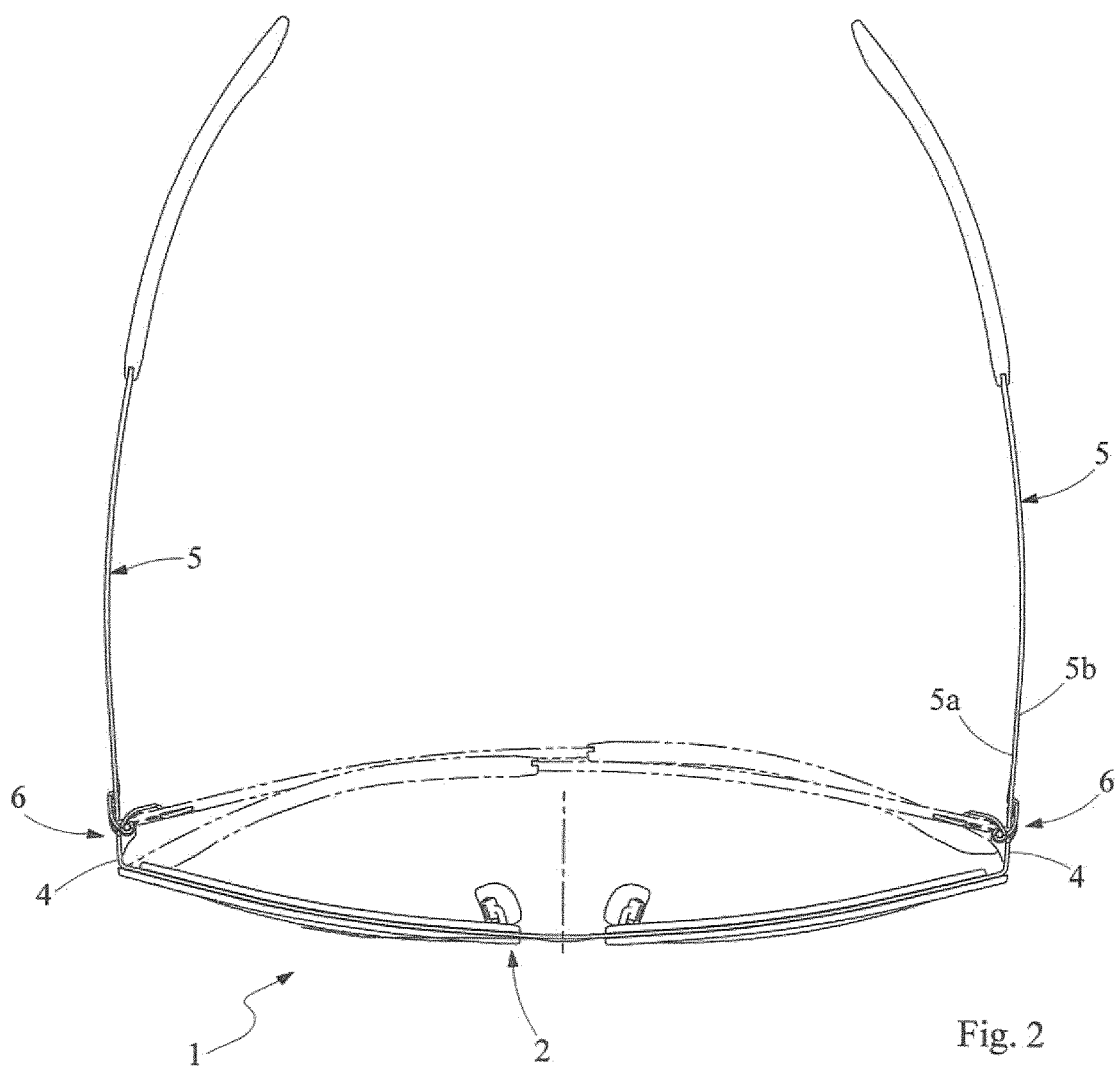
FIG. 2 is a plan view from above of the frame of FIG. 1.

With reference to the above-mentioned figures, the numeral 1 indicates the whole of a frame for spectacles produced according to the present invention, comprising a frontal framework 2, for holding lenses 3, provided with a pair of opposing lateral lugs 4 designed for the articulated connection of respective arms 5 to the frontal framework. For the articulated connection of each arm 5 to the corresponding lug 4, the frame comprises respective articulation means, indicated as a whole by the number 6, suitable for allowing rotation between corresponding open and closed positions of the arm relative to the frontal framework.

Due to the identical structural and functional characteristics, the articulation means of only one of the arms on the frontal framework of the frame will be described below.

As can be seen from the figures, the arms 5 preferably have the form of thin sheets (except for one arm-end suitably shaped for adequate and comfortable support of the arms on the user's head). The lug is similarly intended to have mainly a thin sheet form. In other words, the transverse cross-section of the arm (and of the corresponding lug) has an arm height dimension, measured essentially parallel to the temporal area of the head with spectacles worn, far greater than the thickness of the arm measured in a plane transverse to the height. The structure of the thin section, together with the choice of materials from which it is made, preferably metal, gives the arm as a whole very lightweight characteristics, with reduced bulk and a particularly slender and light longitudinal development of the arm, as well as giving the frame an overall design of notable aesthetic impact.

In accordance with the above-mentioned sheet structure, the thickness of the arm 5 is defined between opposing lateral faces 5a, 5b of the same, the face 5a being identified on the inner side of the arm, i.e. the one facing the user's head, and the face 5b being identified on the opposing outer side of the arm.

The numeral 5c also indicates the end of the arm 5 facing the corresponding lug 4, arranged longitudinally opposite to the arm-end suitable for supporting the frame in the area of the ears.

The articulation means 6 comprise, on the lug, at least one hinge pin, preferably a pair of hinge pins, each indicated by the numeral 7, inserted from opposite sides, and coaxial with each other, of a central body 8 of the lug 4, and suitable for cooperating with the corresponding arm 5 in the articulated coupling of the arm to the frontal framework. The articulation means 6 further comprise a flexible member, indicated by the numeral 9, structurally independent from the lug 4 and the arm 5.

The flexible member 9 also preferably has a sheet structure and is conveniently made from a thin and flexible metal plate. According to the choice of material, the dimensions of the sheet and its geometrical shape, the member 9 has a preselected degree of flexibility. According to a preferred choice, the flexible member 9 is made from steel, and particularly from class "AISI 304" steel, advantageously suitable for the manufacture of components intended to undergo elastic deformation, typical of spring steels, due to its capacity for elastic return and resistance to breakage (generally obtained by suitable heat-treatment of the component).

The flexible member 9 is held on the arm 5 as described in detail below, and is shaped to couple rotatably in a hinge arrangement with the pins 7.

For this hinge coupling, it is provided for the flexible member 9 to have at one of its ends a pair of fingers 9a, 9b, spaced apart from each other and bent to couple (with a suitable open cylindrical surface profile) with the respective pins 7 so as to produce the hinge coupling.

The end 5c of the arm, facing the lug 4, is intended to bear against a superficial profile of the lug 4, described in greater detail below, shaped in such a manner that the arm 5, in its movement about the hinge pins 7, is flexibly constrained towards preselected angular positions relative to the frontal framework, said angular positions including an open position of the arm, suitable for wearing the spectacles, and a closed position of the arm folded on to the frontal framework.

For holding the flexible member 9 on the arm 5, it is provided for a section 10 of said member to be capable of being housed, with minimal play, in a through opening 11 made in the arm 5. Preferably, the opening 11 has a closed outline profile, preferably rectangular with the longer side transverse to the direction of longitudinal development of the arm.

The section 10 is connected at its opposing ends with a respective second and third section of the flexible member 9, indicated respectively by the numerals 12 and 13. Said sections 12, 13 extend from opposite sides of the section 10, in a direction essentially perpendicular to the same, in such a way that when the assembly of the arm on to the lug is completed and the section 10 is engaged in the opening 11, the sections 12 and 13 respectively face the inner face 5a of the arm and the outer face 5b of the arm.

Conveniently, the sections 10, 12 and 13 may be obtained by bending the sheet from which the flexible member 9 is made, with a bending angle of approximately 90° between adjacent sections, as illustrated in FIG. 5.

The section 12 is also shaped in such a way as to be in essential contact with the inner face 5a of the arm, while the section 13 is shaped in such a way as to remain distanced from the outer face 5b of the arm. It is also provided for the section 12 to be at least partially housed in a recess 5d made on the surface of the inner face 5a of the arm. The section 13 further extends, on the side opposite the section 10, into the fingers 9a, 9b which develop with a predetermined angle relative to the section 13, as shown in FIG. 5. In a variant embodiment of the flexible member 9, shown in FIG. 5A, the connecting area between the section 13 and the fingers 9a, 9b is characterised by a greater radius of curvature with respect to that provided for in the example of FIG. 5. According to a main characteristic of the invention, the frame 1 comprises, in each arm 5, a respective distance element, indicated by the numeral 15, which is interposed between the arm 5 and the corresponding flexible member 9 and is mounted on the arm in an adjustable manner in order to impose, at the level of said distance member, a preselected distance between the arm and the flexible member, and consequently to regulate the flexible pre-load exerted on the flexible member 9 when coupled rotatably with the hinge pins 7.

The distance element 15 is mounted on the arm 5 in a position between the area of the arm that holds the flexible member (around the opening 11 in which the section 10 is engaged) and the area of hinged articulation with the pins 7. More specifically, it is provided for the distance element 15 to be mounted on the arm in such a way as to protrude from the outer face 5b of the arm towards the section 13 of the flexible member 9, as can be clearly seen from the figures.

Said distance element 15 is also housed at least partially and rotatably in a housing 16 defined in a circular through opening 16a made in the arm 5. Thanks to this coupling, the distance element is rotatable in the housing 16 between a first position of lesser lateral protrusion from the arm and a second position of greater lateral protrusion from the arm, said protrusion determining the distance set between the arm and the flexible member.

More specifically, the distance element 15 comprises a main body 15a with a cylindrical external profile, from which extend, at one of its axial ends, a pair of tabs, diametrically in alignment with and opposite each other, both indicated by the numeral 17. In the main body 15a are also made a pair of opposing notches 18, extending axially and defining a gripping surface designed to be engaged by a tool (not depicted) suitable for rotating the distance element about its main axially extending axis. Thanks to this structure, the tool can engage in a gripping fashion with the distance element from the inner side of the frame, i.e. on the inner face 5a of the arm.

Figure 10:
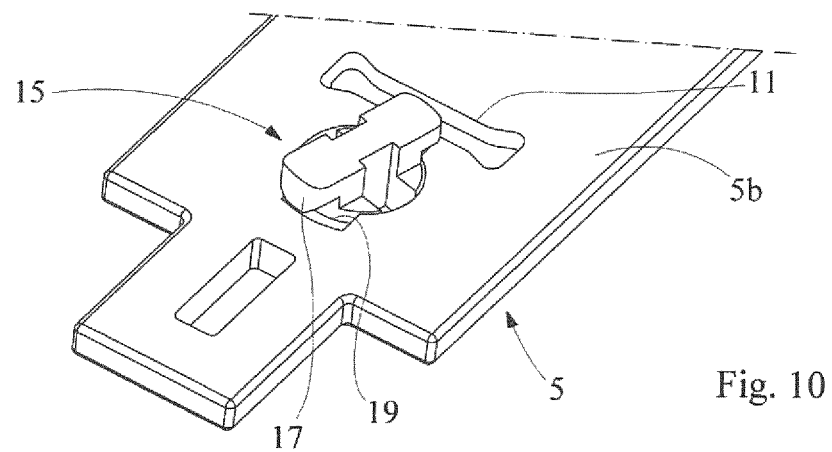
FIGS. 10 and 11 are partial perspective views of the details of FIG. 9 during different steps of assembling the frame.

The outer face 5b of the arm 5 is also provided with a pair of superficial recesses, both indicated by the numeral 19, positioned adjacent to the opening 16a and diametrically aligned relative to said opening. Said recesses 19 house the respective tabs 17 when the distance element is in the first position, with minimal protrusion from the arm (FIG. 10).

Figure 11:
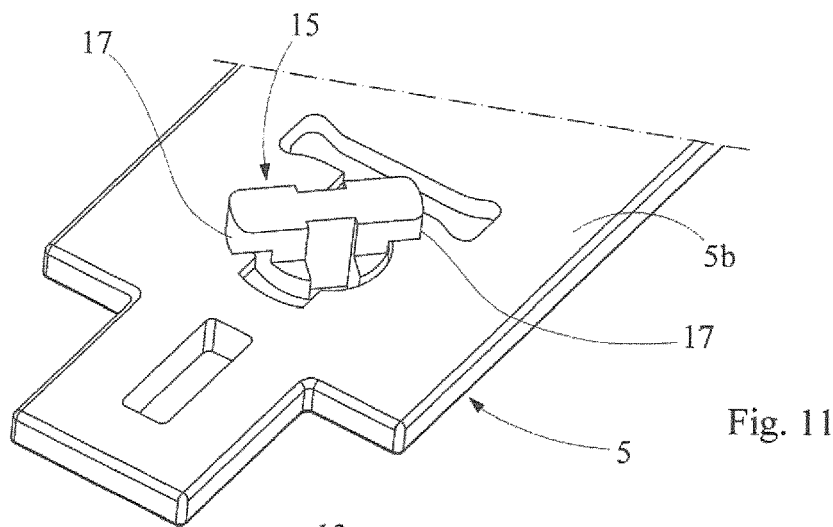
Figure 12:
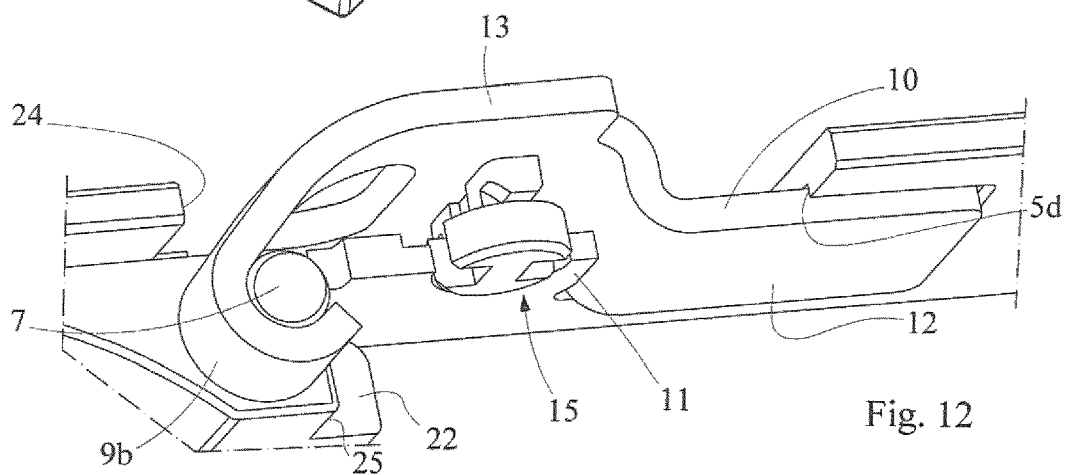
FIGS. 12 and 13 are partial perspective views of the details of FIG. 3, in the assembled state.
Figure 13:
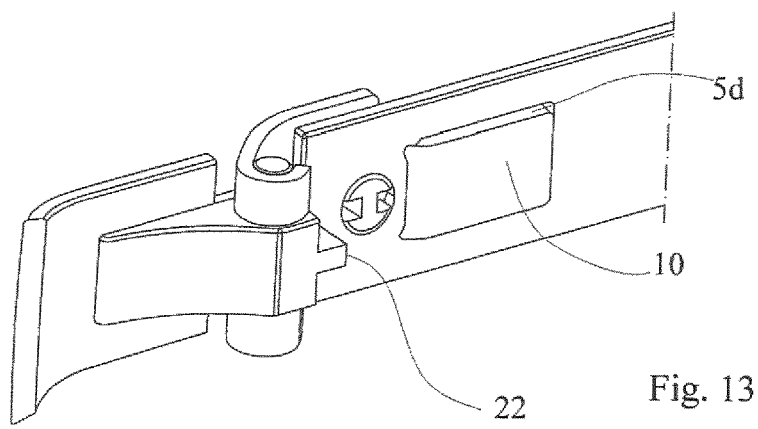
Figure 7A:
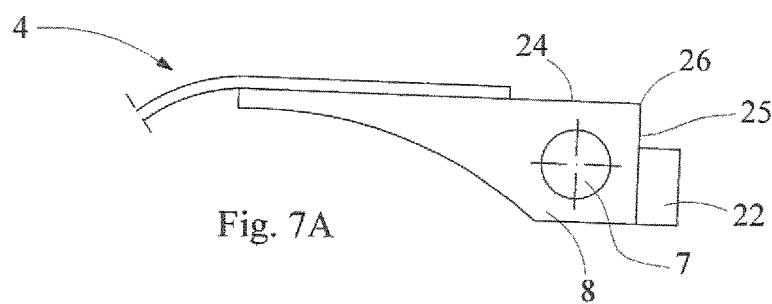
FIG. 7A is a side elevation view, on an enlarged scale, of a further detail of FIG. 3.

The numeral 20 indicates, in each tab 17, a pair of inclined walls, whose shape is such as to result, upon rotation of the distance element from the first position, in an increase in the protrusion of the distance element on the outer side of the arm until it reaches the second position, in which the tabs 17 are disengaged from the respective superficial recesses 19, resulting in a greater protrusion of the distance element 15 from the outer face 5b of the arm (FIGS. 11 and 12).

The numeral 21 indicates a further slotted opening (with a closed contour, preferably of rectangular profile) passing through the arm 5, arranged at the free end 5a of the arm facing the corresponding lug 4, which is capable of being slidably engaged, with minimal play, by a tooth 22 projecting from the corresponding lug 4. This coupling helps to stably guide the arm relative to the lug, for at least a part of its rotation relative to the frontal framework, away from and towards the closed position of said arm.

With particular reference to FIG. 4, it is provided for the openings 21, 16a and 11 to be extended in the arm, starting from the free end 5a, in alignment with each other and spaced apart from each other, along the direction of longitudinal development of said arm.

At the free end 5c, the arm also has a reduced height, thanks to the provision of a pair of opposed recesses 23, which allow the passage of the fingers 9a, 9b from the outer side to the inner side of the arm in order to engage with the hinge pins 7.

The end portion 5c of the arm, extended between the recesses 23, bears against the lug 4 during the rotational movement of the arm. In particular, the lug comprises a first and a second superficial portion 24, 25, contiguous and angled with respect to each other, between which a corner 26 is identified. The tooth 22 rises centrally from the superficial portion 25.

Thanks to the structure described above, the arm-end 5c is capable of remaining bearing against the superficial portion 24 when the arm is in the open position, while it is held bearing against the superficial portion 25 in the closed position on the frontal frame. Said arm-end also bears slidably against the corner 26 during the movement of the arm between the closed and open positions, said movement being a combined rototranslatory movement relative to the frontal framework, as will become clear below.

Figure 9:
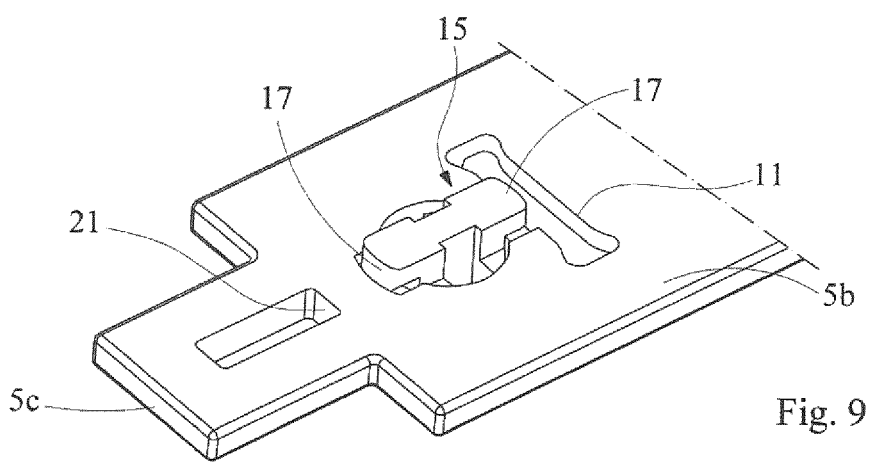
FIG. 9 is a partial perspective view of some details of the frame during the assembly step.

For the assembly of the arm on to the frontal framework, the distance element 15 is first inserted, from the outer side of the arm, into the housing 16 in the condition of FIG. 9, in which the tabs 17 are housed in the respective superficial recesses 19, thus resulting in minimal protrusion of the distance element from the outer face 5b of the arm. The order of magnitude of this protrusion may be a few tenths of a millimetre, for example 0.3 mm in a preferred choice.

Figure 8:
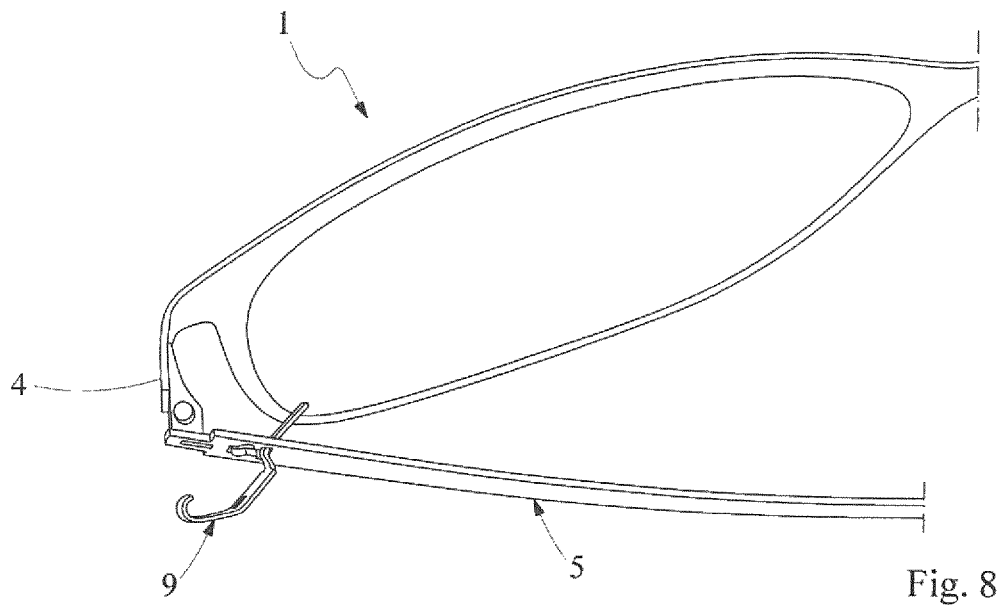
FIG. 8 is a partial perspective view of the frame, during the step of assembling the details shown in FIG. 3.

In this same step, the flexible element is next coupled to the arm, by engaging the opening 11 of the section 10 of the flexible member, as shown in FIG. 8, and simultaneously bringing the arm to the lug and engaging the opening 21 of the tooth 22. In this configuration, a rotation of the flexible member 9 relative to the arm, around the holding area of the section 10 on the arm, allows the pins 7 to be engaged with the corresponding ends of the fingers 9a, 9b of the flexible member, requiring a small deformation of the flexible member. In the configuration thus achieved, it is provided for the distance element 15 to be in contact with the flexible member 9, by exerting a moderate pressure (flexible pre-load) on the section 13 of the flexible member 9.

In alternative embodiments, it may be provided for the distance element 15 not to be in contact with the flexible member and therefore not to exert any pressure on said flexible member (therefore not inducing any elastic deformation such as to create a flexible pre-load in said member).

In this second configuration, the section 12 of flexible member bears against the arm and the section 13 therefore remains spaced from the arm without any pressure exerted on it by the distance element 15.

In a subsequent assembly step, a suitable tool is used to rotate the distance element 15 (by engaging the tool with the gripping surface of the distance element, working from the inner side of the arm), which is moved towards the position of greater protrusion from the arm (sequence of FIGS. 10 and 11). Rotating the distance element 15 causes it to protrude to a progressively greater degree relative to the outer face 5b of the arm, the inclined walls 20 of each tab 17 causing the distance element to be moved further away from the surface of the arm and therefore increasing the degree of protrusion. The rotation is applied until the distance element is rotated preferably by approximately 90° relative to the initial position of FIG. 9.

The distance created by the extraction of the distance element 15 is such as to increase the pressure against the flexible member 9, further elastically deforming the same (relative to its points of attachment to the pins and the arm), thus inducing a flexible pre-load in said flexible member.

In the variant embodiment indicated above, in which the distance element 15 is first fitted to the arm not in contact with the flexible member, the distance created by the subsequent extraction of the distance element 15 is such as to generate a pressure against the flexible member 9, elastically deforming the same (relative to its points of attachment to the pins and the arm), and thus inducing the preselected flexible pre-load. A preferred value of this greater protrusion may, for example, be selected at approximately 0.6 mm, where the lesser protrusion is selected at 0.3 mm.

Due to the pre-tensioning induced, the flexible member 9 tends to exert an elastic return action that allows the arm to be returned automatically to the closed or open position depending on the position adopted, passing through a position of unstable equilibrium (situated at 45° between the fully open and fully closed positions).

It should also be noted that the distance element 15 is produced (with reference to its axial dimension) in such a way that, once moved into the operating position of greatest protrusion from the outer side of the arm, it is essentially superficially flush, on the inner side, with the inner face of the arm, providing a notable aesthetic advantage.

Figure 14:
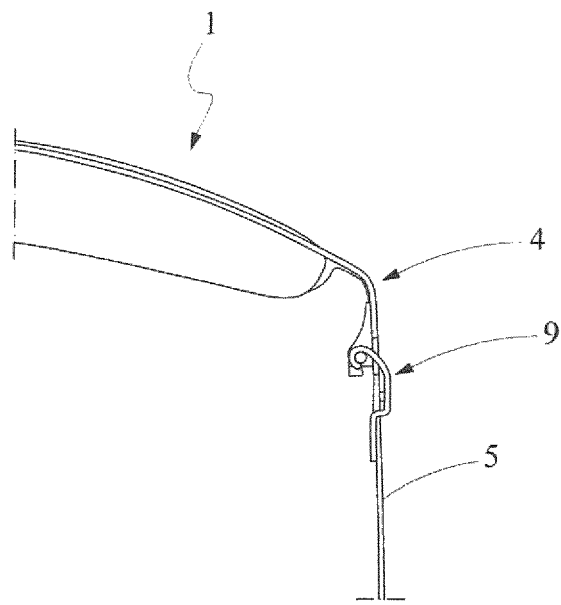
FIGS. 14, 15 and 16 are partial perspective views of the frame in different conditions of rotation about one of the axes relative to the frontal framework of the frame.
Figure 15:
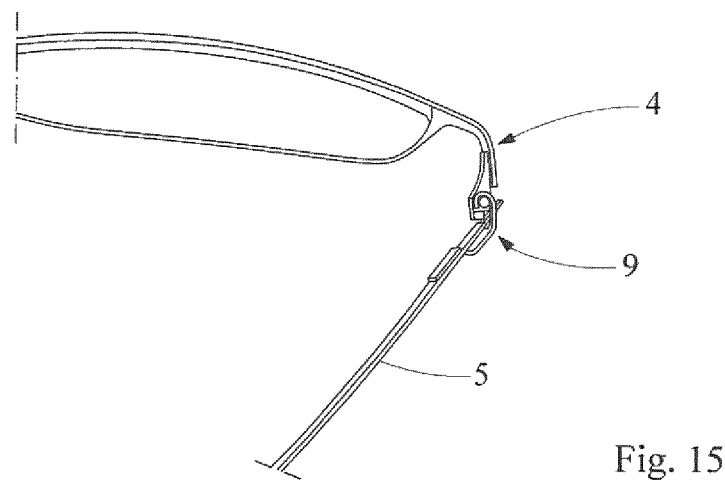
Figure 16:
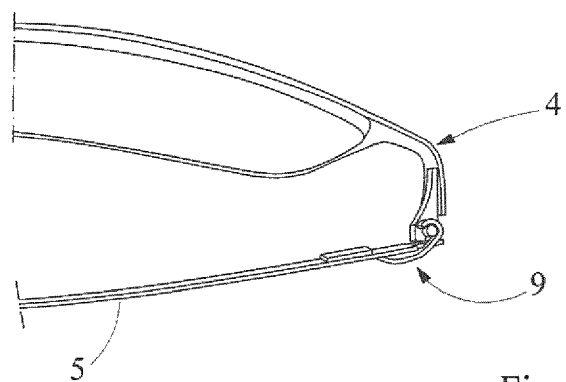

FIGS. 14 to 16 show the sequence of the positions reached in the movement of the arm.

FIG. 14 shows the open position of the arm. In this condition, the arm 5 is in contact (at its end 5c) with the superficial portion 24 of the lug. From this position, the movement of the arm towards the closed position induces an elastic return that tends to return the arm automatically into the open position. This behaviour exists until a position of unstable equilibrium is reached (essentially 45°), shown in FIG. 15, beyond which the elastic return action tends to return the arm towards the closed position on the frontal framework, shown in FIG. 16. In the closed position, the arm 5 bears (at its end 5c) against the superficial portion 25 of the lug. In practice, around the position of unstable equilibrium, a kind of opening or closing "elastic click" is generated, such as to return the arm automatically (without any external impulse) into the respective closed or open position.

In the opening or closing movement, the arm 5 performs a rototranslatory movement relative to the corner 26 of the lug, remaining in sliding contact with the same. In other words, there is a contact with relative friction between the end of the arm and the corner of the lug, induced by the rototranslatory movement of the arm relative to the lug. In addition, in the movement between the closed position (FIG. 16) and the position of unstable equilibrium (FIG. 15) and vice versa, the tooth 22, which is slidably engaged in the slotted opening 21, serves as a guide means for the hinged articulation movement. It should be noted that once the operating position of greatest protrusion has been reached, the disengagement of the distance element 15 from the housing 16 is resisted by the elastic reaction of the flexible member 9, thanks to the interference of said member 9 with the surface of the outer face 5b of the arm.

With reference to FIGS. 17 and 18, a further embodiment of the invention provides that the distance element is produced in the form of a threaded stem 15', for example as a threaded cylindrical bead provided with an upper incision 30 for the use of a screwdriver or similar tool suitable for rotating the threaded stem 15'. In a further alternative, it is possible to produce the distance element as a screw provided with an actuating head and a threaded stem.

Said threaded stem 15' is capable of engaging by screwing with an internally threaded bush 31, which is fixed (for example by welding) on to the inner side of the arm 5 at the level of the circular through opening 16a. The bush, preferably cylindrical in form, may be fixed by one of its end bases on to the inner face of the arm.

The threaded internal hole of the bush is coaxial with the opening 16a, and its dimensions are such as to allow the threaded stem 15' to protrude from the inner face of the arm when screwed (passing through the opening 16a with suitable radial play) into the bush. By means of the threaded coupling, the distance element can therefore be moved axially away from and towards the flexible member 9, elastically deforming the same, in order to induce the preselected flexible pre-load in the same manner as described previously.

The invention thus achieves the proposed aims, providing numerous advantages with respect to the known solutions.

A first advantage consists in the fact that the frame according to the invention allows rapid and easy assembly of the elements of articulation between the lug and the arm, in which the flexible pre-load is introduced after the assembly of the articulation elements and with simplified procedures for the assembler.

A further advantage consists in the fact that the provision of a flexible member between lug and arm, produced independently from the arm, makes it possible to use different manufacturing materials respectively for the arm and the flexible member, optimising the functional properties required of each of these components of the frame.

A further advantage consists in the fact that the frame according to the invention does not require, in the articulation system of the arms, the provision of threaded hinge screws or pins, thus making it advantageously reliable over time and also allowing an operational simplification of the assembly/disassembly of the frame.

A further advantage consists in the simplification of the manufacturing process and the limited number of components of the device. These characteristics make it possible to produce spectacles of extremely compact dimensions and of a particularly lightweight type.

The invention claimed is:

1. A frame for spectacles comprising a frontal framework (2) with respective lateral lugs (4) for the articulation of respective arms (5) and means of articulation between each lug (4) and the corresponding arm (5) for the articulated connection of the respective arm to the frontal framework, said articulation means comprising, for each arm (5), a flexible member (9), structurally independent of the lug (4) and the arm (5), said flexible member (9) being held on the arm (5) and coupled rotatably with at least one hinge pin (7) provided on the corresponding lug (4), the end of each arm (5), facing the corresponding lug, being in contact with a surface profile of said lug (4), shaped in such a manner that the arm (5), in moving about the hinge pin (7), is flexibly constrained towards preselected angular positions relative to the frontal framework (2), said angular positions including an open position of the arm (5), suitable for wearing the spectacles, and a closed position of the arm (5) folded on to the frontal framework (2), the frame comprising, for each arm (5), a respective distance element (15) interposed between each arm (5) and the corresponding flexible member (9), said distance element (15) is mounted on the arm (5) in an adjustable manner in order to impose, at the level of said distance member (15), a preselected distance between the arm (5) and the flexible member (9), and consequently to regulate a flexible preload exerted on said flexible member (9) when coupled rotatably with the hinge pin (7), wherein said distance element (15) is mounted on the arm (5) in a position between an area of a holding arm of the flexible member (9) and an area of articulation of the flexible member with the hinge pin (7), wherein said distance element (15) is housed at least partially in a housing (16) defined in a first through opening (16a) made in the arm and is rotatable in said housing (16) between a first position of lesser lateral protrusion from the arm (5) and a second position of greater lateral protrusion from the arm, said greater protrusion determining the distance set between the arm (5) and the corresponding flexible member (9), wherein the arm (5) has an inner side, facing a user's head on which the frame is worn, and an opposing outer side, said distance element (15) protruding laterally from the outer side of the arm (5) and having on an inner side thereof, a tool gripping surface configured to rotate the distance element (15) between said first and second positions, wherein the outer side of the arm (5) is provided with a pair of recesses (19) positioned adjacent to the first opening (16a) and diametrically opposite each other, which receive, in said first position, a pair of respective tabs (17) extending from a main cylindrical body (15a) of the distance element (15), said tabs (17) being disengaged from said recesses (19) in the second position in order to set the greater protrusion of the distance element (15) on the outer side of the arm (5) with respect to the first position.

2. The frame according to claim 1, wherein said flexible member (9) has a sheet structure with a predetermined flexibility.

3. The frame according to claim 1, wherein said flexible member (9) is produced in the form of a metal sheet.

4. The frame according to claim 1, wherein each lug comprises a first and a second surface portion (24, 25), contiguous and angled with respect to each other, configured to bear against the surface of the end (5c) of the arm facing the corresponding lug, respectively in the open and closed positions of the arm, said end of the arm bearing slidably, in the movement of the arm between said positions, on a corner (26) defined between said first and second surface portions (24, 25) of the lug, said arm being subject to a rototranslatory motion with respect to said corner.

5. The frame according to claim 1, wherein each arm (5) comprises a second through opening (11) configured to house, a first section (10) of the flexible member (9) that is joined at two opposite ends thereof to a second (12) and a third section (13) of flexible member, said second and third sections (12, 13) being shaped in such a way as to lie flush along the inner side and the outer side of the arm (5), respectively, when the first section (10) is engaged in the said through opening (11), for holding the flexible member (9) on the arm (5).

6. The frame according to claim 5, wherein the third section (13) of the flexible member (9) extends, on a side opposite the first section (10), into a pair of fingers (9a, 9b) spaced apart from each other and bent at respective ends thereof in order to couple rotatably with a respective pair of hinge pins (7) of cylindrical profile formed on the corresponding lug (4) of the frame.

7. The frame according to claim 5, wherein the arm (5) comprises a third through opening (21) provided at a free end (5c) of the arm (5) facing the corresponding lug (4), which is configured to engage a tooth (22) projecting from the corresponding lug (4), so as to guide the arm (5) at least for a part of its rotation away from and towards the closed position of the arm on the frontal framework.

8. The frame according to claim 7, wherein said third, first and second openings (21, 16a, 11) are respectively extended in the arm (5) in alignment with each other, and spaced apart from each other, starting from the free end (5c) of the arm.

9. A frame for spectacles comprising a frontal framework (2) with respective lateral lugs (4) for the articulation of respective arms (5) and means of articulation between each lug (4) and the corresponding arm (5) for the articulated connection of the respective arm to the frontal framework, said articulation means comprising, for each arm (5), a flexible member (9), structurally independent of the lug (4) and the arm (5), said flexible member (9) being held on the arm (5) and coupled rotatably with at least one hinge pin (7) provided on the corresponding lug (4), the end of each arm (5), facing the corresponding lug, being in contact with a surface profile of said lug (4), shaped in such a manner that the arm (5), in moving about the hinge pin (7), is flexibly constrained towards preselected angular positions relative to the frontal framework (2), said angular positions including an open position of the arm (5), suitable for wearing the spectacles, and a closed position of the arm (5) folded on to the frontal framework (2), the frame comprising, for each arm (5), a respective distance element (15) interposed between each arm (5) and the corresponding flexible member (9), said distance element (15) is mounted on the arm (5) in an adjustable manner in order to impose, at the level of said distance member (15), a preselected distance between the arm (5) and the flexible member (9), and consequently to regulate a flexible preload exerted on said flexible member (9) when coupled rotatably with the hinge pin (7), wherein said distance element (15) is mounted on the arm (5) in a position between an area of a holding arm of the flexible member (9) and an area of articulation of the flexible member with the hinge pin (7), and wherein said distance element (15) comprises a threaded stem (15'), configured for engaging by screwing into a threaded bush (31) attached to the arm (5) on an inner side thereof, said stem (15') passing through an opening provided in the arm so as to protrude on an outer side of the arm, thus producing the preselected distance between the arm (5) and the flexible element (9), and consequently regulates the flexible pre-load exerted on said flexible member.

\* \* \* \* \*